United States Patent [19]
Warner et al.

[11] Patent Number: 5,579,044
[45] Date of Patent: Nov. 26, 1996

[54] DIGITAL PROOFING SYSTEM

[75] Inventors: Andrew Warner, Harvard; Alward I. Pinard, Westford; Harold Thidemann, Belmont, all of Mass.

[73] Assignee: Intergraph Corporation, Huntsville, Ala.

[21] Appl. No.: 110,301

[22] Filed: Aug. 20, 1993

[51] Int. Cl.$^6$ .................................................. B41J 2/47
[52] U.S. Cl. ........................................................ 347/236
[58] Field of Search ................................ 347/236, 237, 347/243, 260, 259, 253, 246, 132

[56] References Cited

U.S. PATENT DOCUMENTS

| | | | |
|---|---|---|---|
| 3,576,627 | 4/1971 | Wirth | 96/23 |
| 3,688,026 | 8/1972 | Odnolko et al. | 178/6.7 |
| 3,713,721 | 1/1973 | Watson | 347/255 |
| 3,796,575 | 3/1974 | Kirsch | 96/14 |
| 3,825,335 | 7/1974 | Reynolds | 355/1 |
| 3,950,093 | 4/1976 | Schneider | 355/37 |
| 4,124,292 | 11/1978 | Van Wandelen | 355/37 |
| 4,188,111 | 2/1980 | Marvin | 355/37 |
| 4,244,005 | 1/1981 | Jurgensen | 358/201 |
| 4,296,441 | 10/1981 | Ogasawara | 358/293 |
| 4,321,564 | 3/1982 | Tregay | 332/7.51 |
| 4,416,522 | 11/1983 | Webster | 354/4 |
| 4,425,417 | 1/1984 | Ingalls et al. | 430/30 |
| 4,558,372 | 12/1985 | Culter | 358/264 |
| 4,571,373 | 2/1986 | Musser et al. | 430/143 |
| 4,661,861 | 4/1987 | Rutherford et al. | 358/302 |
| 4,705,745 | 11/1987 | Kitchin et al. | 430/505 |
| 4,725,891 | 2/1988 | Manian | 358/285 |
| 4,728,983 | 3/1988 | Zwadlo et al. | 355/4 |
| 4,814,827 | 3/1989 | Kitchin et al. | 355/37 |
| 4,818,663 | 4/1989 | Powers et al. | 430/358 |
| 4,833,528 | 5/1989 | Kobayashi | 358/53 |
| 4,924,261 | 5/1990 | Okino | 355/35 |
| 4,985,779 | 1/1991 | Gall | 358/298 |
| 4,992,890 | 2/1991 | Pinard et al. | 358/474 |
| 5,075,779 | 12/1991 | Lefebvre | 358/298 |
| 5,255,257 | 10/1993 | Bryant et al. | 369/121 |

FOREIGN PATENT DOCUMENTS

| | | |
|---|---|---|
| 0173032 | 3/1986 | European Pat. Off. . |
| 0326346 | 8/1989 | European Pat. Off. . |
| 0426113 | 5/1991 | European Pat. Off. . |
| 2601787 | 1/1988 | France . |
| 2603118 | 2/1988 | France . |
| 2199465 | 7/1988 | United Kingdom . |

*Primary Examiner*—Mark J. Reinhart
*Attorney, Agent, or Firm*—Bromberg & Sunstein

[57] ABSTRACT

A system that permits the plotting of any combination of several colors in one pass. Three differently colored light sources are provided, and thus one, two or three colors may be plotted at the same time. An apparatus is provided for causing relative movement between the scanning head and the substrate along each of the two axes of the substrate. Preferably, the first axis is disposed circumferentially about a cylinder, on which the substrate is situated, the cylinder having a central axis, and the second axis is disposed approximately parallel to the central axis. The system includes deflection means, preferably acousto-optical modulators, for deflecting along a path a portion of each beam of light by an amount dependent upon the frequency of a signal that is present at the deflection means' input.

12 Claims, 9 Drawing Sheets

DIGITAL PROOFING SYSTEM

TECHNICAL FIELD

This invention relates generally to systems for making reproductions, and particularly systems for making proofs of halftone reproductions.

BACKGROUND ART

U.S. Pat. No. 4,992,890, for an invention by Pinard, Girzon and Warner, entitled "System for Plotting and Scanning Graphic Images," describes a system for plotting and scanning graphic images and is incorporated herein by reference. The ColorSetter 2000 and ColorSetter 4000 products, made by the Optronics Division of Intergraph Corporation, Chelmsford, Mass., use technology disclosed in this U.S. patent. (ColorSetter is a registered trademark of Intergraph Corporation.)

The system described in U.S. Pat. No. 4,992,890 makes it possible to scan or plot an n-pixel wide swath using only one light-beam source. FIG. 1A of the present application shows the arrangement used in this system. An acousto-optical (A/O) crystal serves as the deflection means 10, which deflects the light beam 18 from an undeflected path, denoted in FIG. 1A as $P_0$. The degree that the A/O crystal deflects the beam 18 is a function of the frequency of a vibratory waveform, which is created by a transducer 14—typically a piezo-crystal—which converts electrical signals from a radio-frequency signal generator 12.

The signal generator 12 delivers a set of up to n frequencies, each of which causes one of the light beam paths $P_1$, $P_2$, $P_3$ ... $P_n$. Whether a portion of the beam 18 follows one of these paths depends on whether a vibratory waveform at a certain frequency is applied to the A/O crystal. The strength of the sub-beam—i.e., deflected beam portion—that follows that path is a function of the amplitude of the vibratory waveform at the frequency associated with that path. When no vibratory stimulus is applied, all of the original beam 18 follows path $P_0$ and is blocked by a mask 24 from reaching the target media (substrate) 26, which may be a film that is to be exposed so as to create an image thereon, or which may contain an image to be scanned. If the vibratory stimulus has two different frequency components, the original beam 18 is split into two separate first-order sub-beams. Non-first-order sub-beams and heterodyned beams are also produced, but these extraneous beams are also blocked by the mask 24.

In one of the embodiments disclosed in U.S. Pat. No. 4,992,890, the substrate 26 is mounted on a rotating drum. Plotting information for a swath is broken up into n portions, one for each of the N sub-beam paths ($P_1$–$P_N$). In the example discussed in U.S. Pat. No. 4,992,890, up to eight different vibratory signals are created, and two sub-beams expose the substrate 26 at any one instant. First, sub-beams along paths $P_1$ and $P_5$ are directed towards the substrate. Then sub-beams along paths $P_2$ and $P_6$, then sub-beams along paths $P_3$ and $P_7$, and finally sub-beams along paths $P_4$ and $P_8$ are directed towards the substrate. While all eight of these sub-beams have the opportunity to expose the target substrate 26, the drum on which the substrate is mounted is rotating, and, after all eight of these sub-beams has exposed the substrate, the drum has rotated so that the circumferential surface of the drum has moved the distance of one pixel. The sequence of sub-beams is then repeated: first, paths $P_1$ and $P_5$ are used, then paths $P_2$ and $P_6$, etc. In effect, two sub-beams together scan the width of the swath, with each of the two sub-beams scanning four pixels during each scan.

The angle of deflection caused by the A/O crystal 10 is tilted so that the rotation of the target drum on which the substrate 26 is mounted causes the eight pixels formed by each of the sub-beams to line up in the manner shown in FIG. 1B. (Of course, depending on the image to be formed on the substrate, less than all—or perhaps none—of the eight pixels shown in FIG. 1B may be exposed by the sub-beams.) The set of eight pixels shown in FIG. 1B is repeatedly formed one below the other so as to cover a swath each time the drum rotates. Since the scanning head is mounted on a carriage that constantly moves in a direction parallel to the drum's axis of rotation, while the drum rotates, swaths are formed next to each other so as to cover the surface of the substrate that is to be exposed. This series of swaths covering the substrate may be considered a single helical swath around the surface of the drum. The system may be adapted so that any number of sub-beams may be used.

In the prior-art ColorSetter plotters, the beam's shaping assembly 22, the A/O crystal 10, the piezo-crystal 14 and the mask 24 are mounted on the moving optics carriage, which is moved in a direction parallel to the drum's axis of rotation by a rotating lead screw. These plotters were typically used to create separates on a transparent substrate. Such separates are used to form printing plates used in printing multicolored images. Typically four separates are made, one for each of the printing plates that will apply cyan, magenta, yellow and black ink.

U.S. Pat. No. 4,985,779, for an invention by Gall, entitled "Improved Method and Apparatus for Generating Halftone Images," discloses a system for generating halftone images and is also incorporated herein by reference. It uses coordinate transformation and look-up tables to screen the image information. The screened image information is sent to radio-frequency signal generators, which generate signals for the acousto-optical modulators in the scanning head. The microdots referred to in U.S. Pat. No. 4,985,779 are referred to as pixels herein. A plurality of pixels, or microdots, are used to form a halftone dot.

SUMMARY OF THE INVENTION

The invention provides a system that permits the plotting of any combination of several colors in one pass. At least two original beams having different wavelengths are provided, and thus one or two colors may be plotted at the same time. Preferably three original beams are provided, so that one, two or three colors may be plotted at the same time. Alternative embodiments may use more than three original beams. The source means creating the three original beams preferably comprises three lasers providing red, green and blue beams. In one embodiment, the system includes deflection means, preferably acousto-optical modulators, for deflecting along a path a portion of each beam by an amount dependent upon the frequency of a signal that is present at the deflection means' input. This embodiment includes a signal generator for providing a plurality of signals, each having a different frequency, to the deflection means. This embodiment further includes a scanning head from which beams are directed onto the substrate, which may be light-sensitive film or paper, or which may be a medium containing an image which is scanned. The substrate has first and second axes, and translation means are provided for causing relative movement between the substrate and the beams striking the substrate along each of the two axes of the substrate. Preferably, the first axis is disposed circumferentially about a cylinder, on which the substrate is situated and which has a central axis, and the second axis is disposed approximately parallel to the central axis.

The system preferably includes optics and timing mechanisms for making the beam portions coincident, so that, for a given pixel that is to be exposed by each of the two or three beams, portions of each of the two or three beams may expose that pixel on the substrate at the same time. The coincident beam portions are together referred to as a combination beam. Preferably, a feedback system is used to adjust the length of time between when the signal generates a signal and when the sub-beam associated with that signal strikes the substrate. This feedback system may be used to ensure that the coincident beam portions strike the substrate at the same time. Such a feedback system may be used with either plotters or scanners that use beams to expose the substrate being scanned. (Plotters and scanners are collectively referred to herein as image-information converters).

The signal generator, in a preferred embodiment of the invention, provides a plurality of signals for each of the two or three or more original beams, so that the deflection means may create a plurality of sub-beams, i.e., deflected beam portions, from each of the original beams. In one embodiment, the plurality of signals for each of the original beams includes a pair of first and second signals having different frequencies. The first and second signals cause the deflection means to create two sub-beams from each of the original beams. In alternative embodiments, more than two sub-beams are created from each original beam; any number, n, of sub-beams may be created from each original beam, so as to form n combination beams. As relative translation is caused between the scanning head and the substrate along the first axis, each of the combination beams may expose points on the substrate that define a line substantially parallel to the substrate's first axis, and several passes are typically made along the first axis. Where n sub-beams are created from each original beam, there are preferably n pixel spaces between the combination beams as they strike the substrate, and preferably, from one pass to the next along the first axis, the combination beams advance n spaces across the substrate along the second axis. As noted above, the substrate may be mounted around the circumference of a cylinder, and in such an embodiment, the substrate may be plotted along n helical paths around the circumference of the cylinder so that the scanning head passes over the substrate several times along the first axis while making one pass along the second axis.

Only one of the original beams may be used to expose a substrate sensitive primarily to the wavelength of that beam. In this one-color mode, the signal generator means may produce a plurality of signals which includes a first set of signals below an established frequency and a second set of signals above the established frequency. The signal generator supplies simultaneously to the deflection means a signal from the first set and a signal from the second set in successive pairs of signals so as to cause scanning of sub-beams in a direction parallel to the second axis simultaneously at two different and proximate locations along the first axis. Thus, when the substrate is mounted on a cylinder and the system is in the one-color mode, a helical swath may be formed around the circumference of the cylinder in much the same way as the system described in U.S. Pat. No. 4,992,890.

The one-color mode may be used to generate the separates used to make printing plates, and the multicolor mode may be used to generate proofs. Preferably, the plotter uses the same screening system in both its multicolor and one-color modes, so that the image plotted directly by the plotter in the multicolor (proofing) mode is similar in that respect to the image created by the printing plates formed from the color separates generated by the plotter in the one-color (separates) mode. Such a plotter also preferably uses dot-gain (screening) look-up tables (LUTs) in the proofing mode that take into account the overall system transfer function in the one-color mode so that the halftone dots of the reproduction created in the proofing mode are substantially the same size as the halftone dots of the reproduction created by the printing process. Likewise color-correction factors, preferably embodied in color-correction LUTs, are used in the multicolor mode so that the colors of the reproduction created in the proofing mode closely match the colors of the reproduction created by the printing process.

BRIEF DESCRIPTION OF THE DRAWINGS

These and other features, aspects and advantages of the present invention will become better understood with regard to the following description, appended claims and accompanying drawings where:

DESCRIPTION OF SPECIFIC EMBODIMENTS

Figure 2:
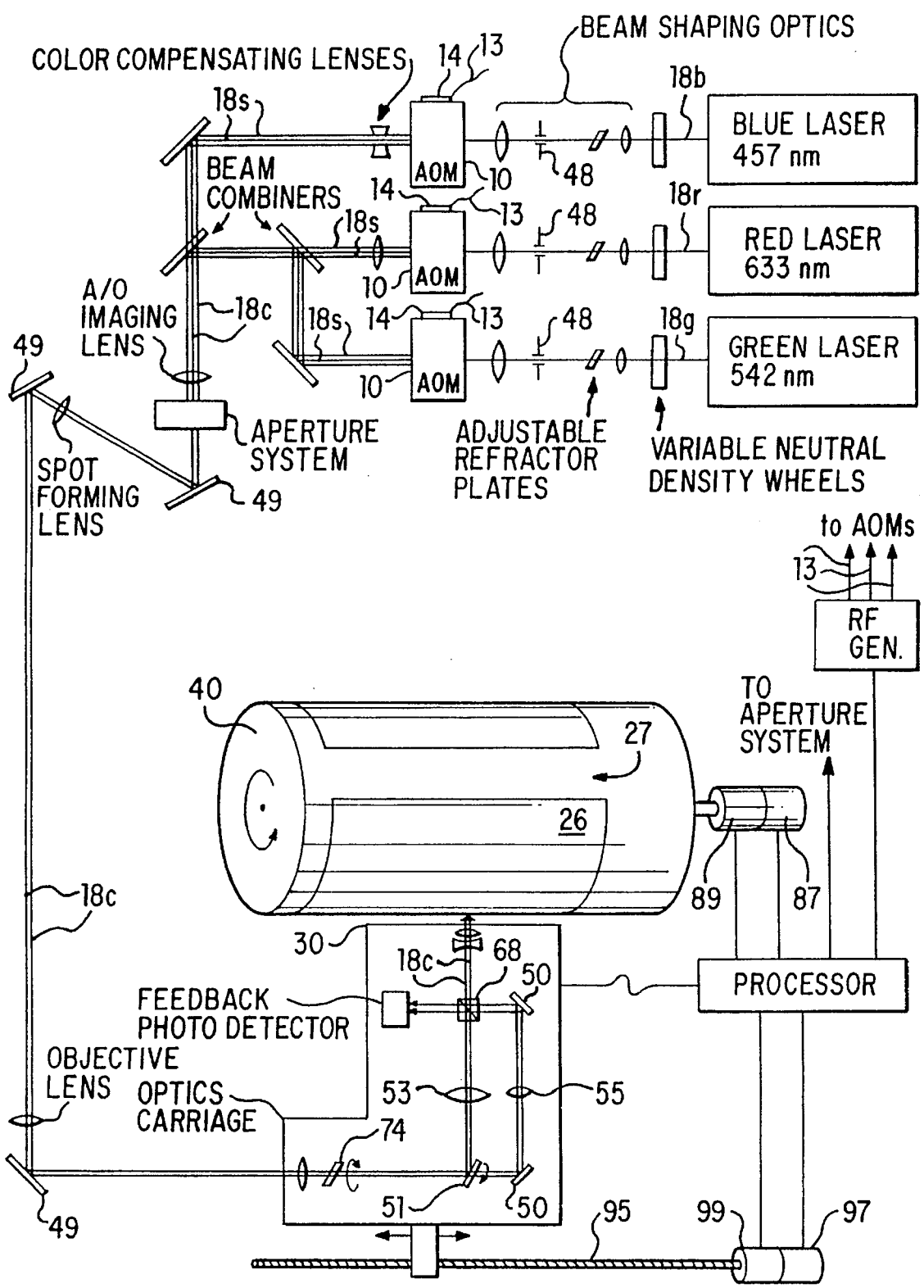
FIG. 2 shows a schematic setting forth the elements of a preferred embodiment of the present invention.

As shown in FIG. 2, which is not to scale, the present invention uses, as light-beam sources, several lasers, which provide original beams having different frequencies. In a preferred embodiment, a helium-neon laser creating a red light beam 18r (633 nm), a helium-neon laser creating a green light beam 18g (542 nm) and an argon-ion laser creating a blue light beam 18b (457 nm) are used. The beam of each of the lasers is filtered by its own variable neutral-density filter wheel and is shaped by its own set of optics, which include lenses, an adjustable refractor plate and an aperture. Instead of gas lasers, laser diodes or other types of light sources may be used to create the original beams.

Figure 1A:
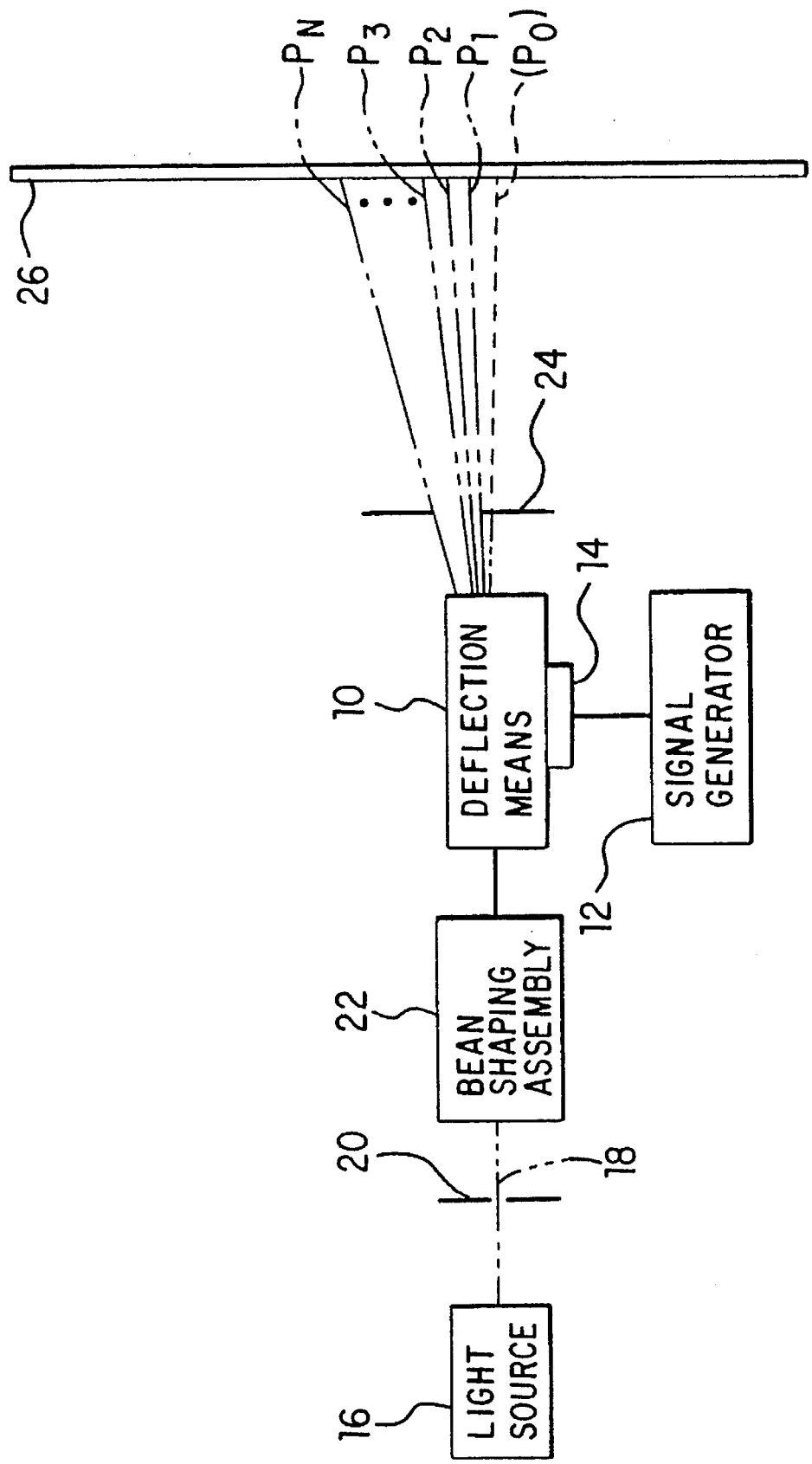
FIG. 1A shows a schematic setting forth elements of the device described in U.S. Pat. No. 4,992,890.
Figure 3:
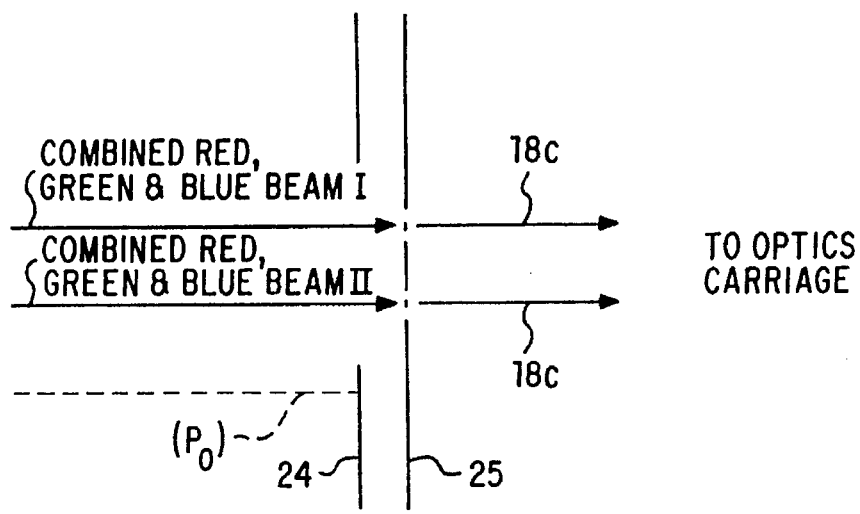
FIG. 3 shows an aperture system used in an embodiment of the invention that uses two multicolored beams.
Figure 1B:
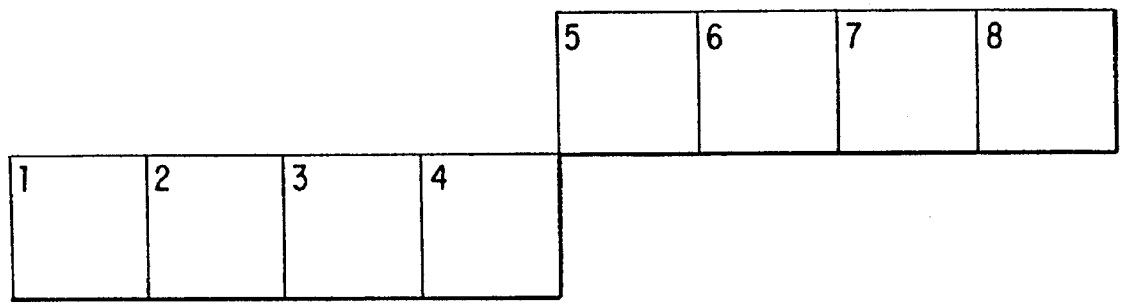
FIG. 1B represents the arrangement of pixels formed while the drum is rotating by the acousto-optical modulator of the device described in U.S. Pat. No. 4,992,890.

The system shown in FIG. 2 may be used to expose a multicolor-sensitive film or paper with the red, green and blue laser beams to develop a multicolor image, such as a proof. Such a proof may be used to make a preliminary evaluation of the reproduced image before the printing plates are made, thereby avoiding the cost and the extra time needed to create and use plates that may not be used. Alternatively, only one of the lasers may be used to expose a film in the manner of U.S. Pat. No. 4,992,890, so as to create four color-separated images. For example, the blue laser may be used to expose blue-sensitive film, and typically four separates (for making printing plates for cyan, magenta, yellow and black inks) are made on the blue-sensitive film. In this mode, eight sub-beams are deflected by the acousto-optical modulator (AOM) from the original blue beam 18b created by the laser, so that, in the preferred embodiment, two sub-beams are on at any one instant, and each of the two sub-beams effectively scan a swath of the substrate four pixels wide. The blue sub-beams pass through the aperture system. When using only one color, the aperture system interposes only a mask 24 in the path of the beams. (The aperture plate 25 shown in FIG. 3 is swung away from the path of the sub-beams in the one-color mode.) This mask 24, just like the mask shown in FIG. 1, blocks the undeflected blue beam (which travels along path $P_0$) and extraneous sub-beams. The first-order deflected sub-beams pass through the mask, then are reflected off of several folding mirrors 49 to the movable optics carriage.

Unlike in the system described in U.S. Pat. No. 4,992,890, the AOM and the mask 24 of the FIG. 2 system are not located on the movable optics carriage, but rather are located in fixed relation with the light-beam source. This arrangement avoids crowding the optics carriage with the three AOMs, the beam combiners and the aperture system. It will be readily appreciated that, in an alternative embodiment of the invention, the AOMs, the beam combiners, the aperture system, and even the lasers themselves may be located on the optics carriage. After entering the optics carriage, the blue sub-beams are directed onto the substrate 26 mounted on the rotating drum 40. The eight blue sub-beams cover a helical swath around the drum 40. As is discussed in greater detail below, instead of using blue light to expose blue-sensitive film, red or green light may be used to expose red- or green-sensitive film. Other than the location of certain elements (off or on the optics carriage) the system shown in FIG. 2, in its one-color mode (i.e., one-laser mode), functions substantially the same way as the device described in U.S. Pat. No. 4,992,890.

In order to expose a multicolor-sensitive medium—so as to generate a proof, for example—all three lasers are used. Preferably, a negative-acting emulsion on white reflective paper is used, so that the red light beam 18r creates a cyan-colored dot on the paper, the green beam 18g creates a magenta-colored dot, the blue beam 18b creates a yellow-colored dot, and all three beams if turned on at the same time create a black dot. Since half-tone reproductions typically use cyan, magenta, yellow and black dots, the use of red, green and blue beams on a paper with negative-acting emulsion provides a proof that represents a typical halftone reproduction. Instead of photosensitive paper, transparent color film may be used. Instead of using a negative-acting emulsion, a positive-acting emulsion may be used; the control system that modulates the beams exposing the substrate must, of course, be adapted so as to properly expose a positive-acting emulsion. After the substrate, be it film or photosensitive paper, has been exposed, it is processed in its normal manner to generate a finished image, such as a proof.

As shown in FIG. 2, each of the three original beams passes through a separate acousto-optical modulator, AOM, each of which includes an A/O crystal 10 and a transducer 14. Like in the one-color mode, the transducers 14 receive signals from a radio-frequency generator. Each of the AOMs may deflect one or more sub-beams 18s from the main beam. The sub-beams 18s exiting the AOMs are then combined through a pair of wave-length selective mirrors, thereby forming combination beams 18c, which are made up of portions of the beams 18r, 18g and 18b from each of the light sources. Two sub-beams may be created by each of the three AOMs. These six sub-beams 18s—two from each AOM—are then combined to form two combination beams 18c, each of which may have red, green and blue elements. The system shown in FIG. 2 may be used to expose a substrate using only a single combination beam 18c. Of course, the use of multiple combination beams 18c greatly reduces the amount of time needed for plotting a substrate.

FIG. 3 shows the main components of the aperture system shown in FIG. 2. An aperture plate 25, shown in FIG. 3, is placed in the path of the combined beams 18c during the multicolor proof mode. The aperture plate has two apertures, through which the two combined beams 18c may pass. As will be discussed below, alternative embodiments may have more than two beams combined from portions of the red 18r, green 18g and blue 18b beams. The aperture plate in such an embodiment must have a separate aperture for each of the combination beams. The mask 24 blocks the main beams, which were not deflected by the AOMs and therefore follow path $P_0$, as well as extraneous sub-beams. The aperture plate 25 further ensures that extraneous sub-beams do not pass through to the optics carriage and the substrate 26.

Figure 4A:
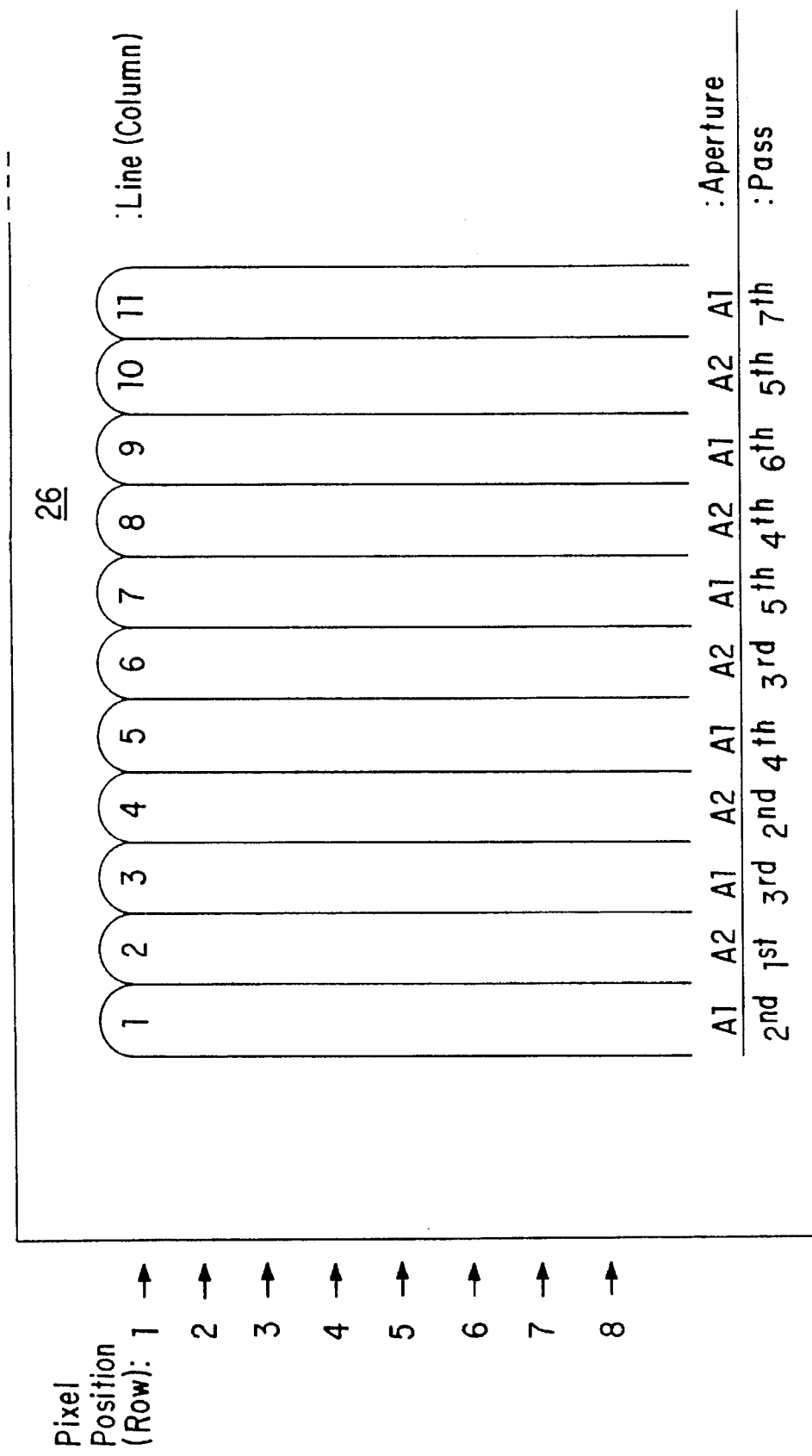
FIGS. 4A, 4B and 4C show respectively how embodiments using two, three and four multicolored beams expose a substrate.

FIG. 4A shows how the two combination beams 18c may expose a target substrate 26. The combination beams are spaced apart so as to minimize crosstalk and scatter between adjacent lines. For two combination beams 18c, the beams 18c are spaced apart so that when they reach the substrate 26 there are two horizontal pixel spaces between them. (Note that there may be a slight divergence between the two combination beams 18c, because the sub-beams from each original beam start at the same point, namely the point where the original beam enters the AOM. The spot-forming lens, which is shown in FIG. 2, bends the combination beams 18c so that they become more parallel.) When n combination beams are used, there are preferably n horizontal pixel spaces between them.

Preferably, the electrical signals are sent to AOMs so that both combination beams do not expose the substrate at the same time, but rather alternate, so that the combination beam passing through the first aperture is on while the combination beam passing through the second aperture is off, and then the beam passing through the first aperture is off while the beam passing through the second aperture is on. This switching back and forth between apertures occurs very quickly—in one embodiment, the first aperture is used for 200 nanoseconds, while the second aperture is used for the next 200 nanoseconds.

As can be seen in FIG. 4A, on the first pass (i.e., the first rotation of the drum) only the second vertical line is exposed. The combination beam passing through the first aperture is not turned on during the first pass in order to create a white border around the reproduced image, as is usually desired. (If a positive-acting emulsion on white reflective paper is used, the border of the image is exposed to all three colors in order to create a white border. The discussion herein is directed primarily to the use of a negative-acting emulsion with a white reflective background, wherein white is produced by not exposing the emulsion to any of the colors.) The second vertical line is exposed by the combination beam passing through the second aperture. On the second pass, the first vertical line is exposed by the combination beam passing through the first aperture, while the fourth line is exposed by the combination beam passing through the second aperture. On the third pass, the first aperture's beam exposes the third line, while the second aperture's beam exposes the sixth line. Thus, the two lines being exposed during each pass are separated by two pixel spaces, and each beam advances two pixel spaces from one pass to the next.

In the multicolor proof mode, the speed that the optics carriage moves along a line parallel to the drum's axis of rotation must be reduced, because in this mode only two lines are exposed on the substrate during each revolution of the drum, whereas in the one-color mode eight lines are exposed per revolution. The speed of the optics carriage is controlled by an electronic processor, which controls the motor 99 turning the lead screw 95 which moves the optics carriage. A shaft encoder 97 may be used to provide information to the processor regarding the speed of the lead screw 99. Instead of a shaft encoder, a linear encoder may be used to measure the position of the optics carriage (and thereby measure the position of the scanning head 30 with respect to the substrate 26 along the axis parallel to the drum's axis of rotation).

As noted above, the combination beams alternately expose pixels. On a typical pass, the first aperture's beam exposes a first pixel then the second aperture's beam exposes a second pixel (horizontally spaced three pixels away from the first pixel), then the first aperture's beam exposes the pixel directly below the first pixel, then the second aperture's beam exposes the pixel directly below the second pixel, etc. Thus, two combination beams may expose the image pixel positions on the substrate 26 in the following order:

| 1st Pass: | | Col.2, Pix.1; | | Col.2, Pix.2; | ... |
|---|---|---|---|---|---|
| 2nd Pass: | Col.1, Pix.1; | Col.4, Pix.1; | Col.1, Pix.2; | Col.4, Pix.2; | Col.1, Pix.3; ... |
| 3rd Pass: | Col.3, Pix.1; | Col.6, Pix.1; | Col.3, Pix.2; | Col.6, Pix.2; | Col.3, Pix.3; ... |
| 4th Pass: | Col.5, Pix.1; | Col.8, Pix.1; | Col.5, Pix.2; | Col.8, Pix.2; | Col.5, Pix.3; ... |
| 5th Pass: | Col.7, Pix.1; | Col.10, Pix.1; | Col.7, Pix.2; | Col.10, Pix.2; | ... |
| 6th Pass: | Col.9, Pix.1; | Col.12, Pix.1; | Col.9, Pix.2; | Col.12, Pix.2; | ... |
| 7th Pass: | Col.11, Pix.1; | Col.14, Pix.1; | Col.11, Pix.2; | Col.14, Pix.2; | ... |
| 8th Pass: | Col.13, Pix.1; | Col.16, Pix.1; | Col.13, Pix.2; | Col.16, Pix.2; | ... |
| 9th Pass: | Col.15, Pix.1; | Col.18, Pix.1; | ... | | | wherein the column (i.e., vertical line) and pixel positions are based on the arrangement shown in FIG. 4A.

Figure 4B:
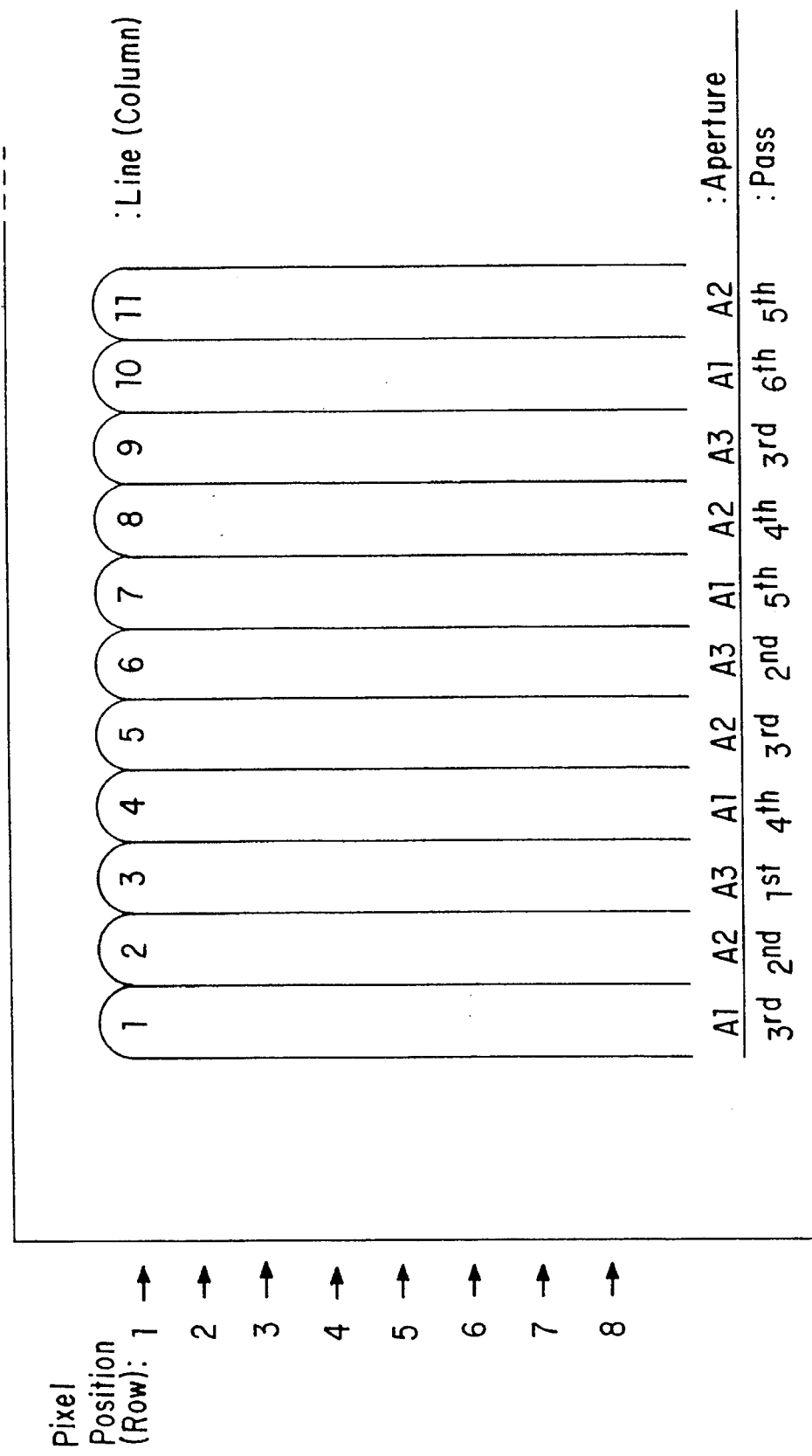

FIG. 4B shows how an embodiment using three combination beams may expose a substrate. As can be seen in FIG. 4B, during each pass, there are three horizontal spaces between each of the combination beams. For instance, on the third pass, the first aperture's beam exposes the first line, the second aperture's beam exposes the fifth line, and the third aperture's beam exposes the ninth line. Furthermore, from pass to pass, each combination beam advances three horizontal spaces. For instance, the combination beam passing through the first aperture exposes the first line on the third pass, exposes the fourth line on the fourth pass, exposes the seventh line on the fifth pass, and so on. Meanwhile, the combination beam passing through the second aperture exposes the second line on the second pass, the fifth line on the third pass, and so on. The combination beam passing through the third aperture also advances three horizontal spaces each pass.

Figure 4C:
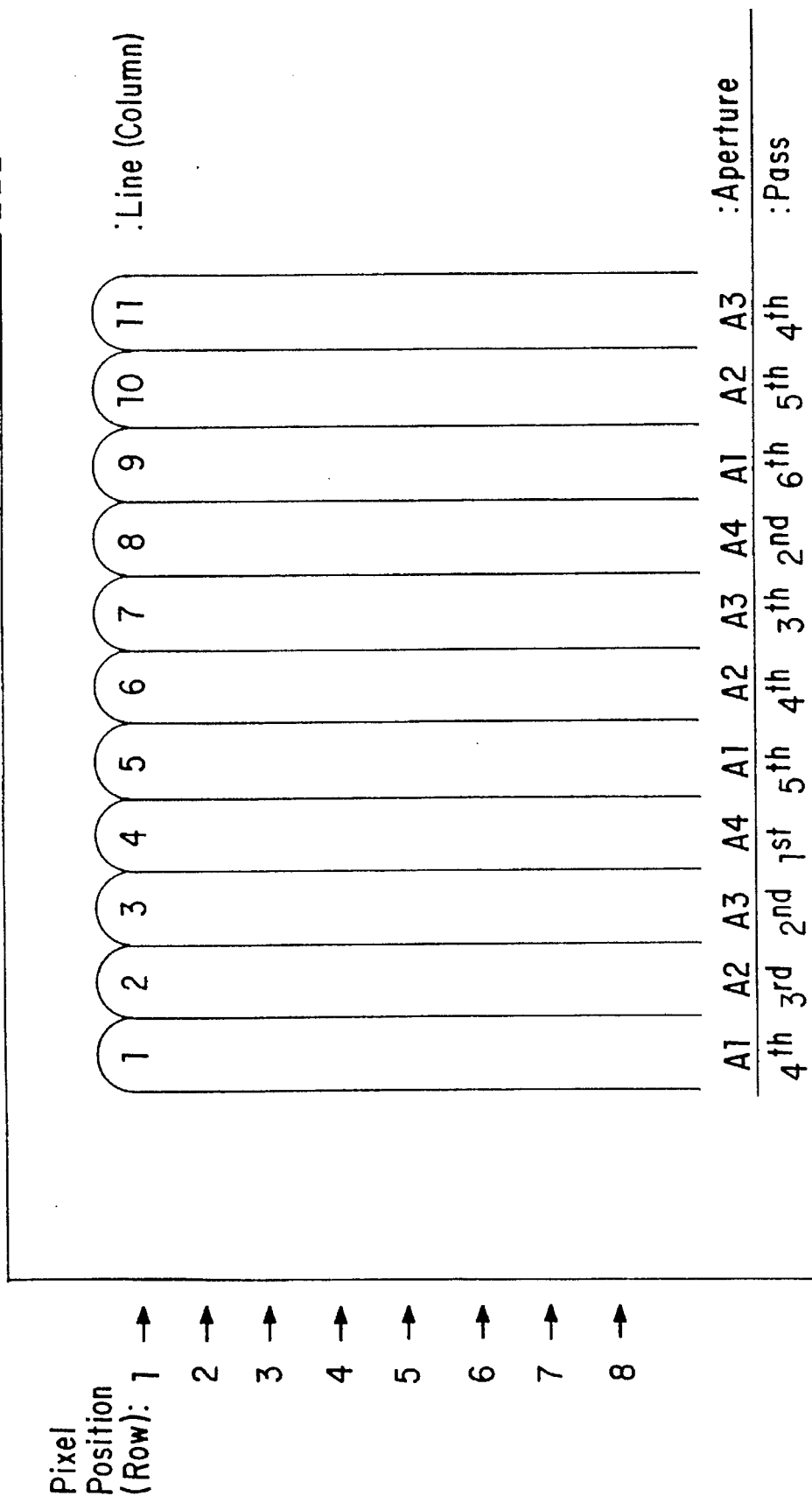

FIG. 4C shows how an embodiment using four combination beams may expose a substrate; there are four horizontal spaces between each of the combination beams during each pass, and each combination beam advances four horizontal spaces each pass. The system may be modified so that it can create any number, n, of combination beams. Preferably, for n combination beams, n spaces separate the lines being plotted during any pass, and each combination beam advances n spaces from pass to pass.

Figure 5:
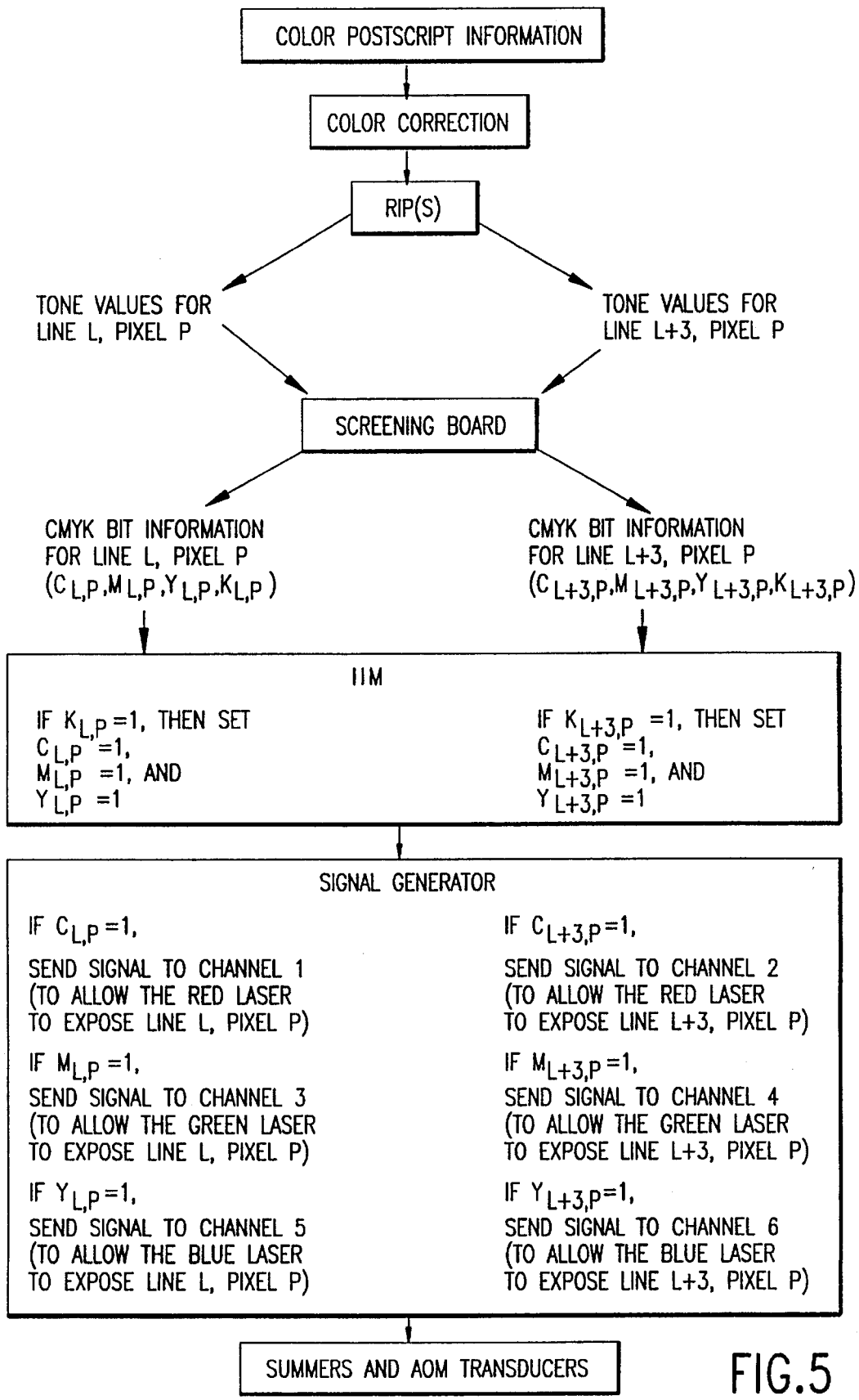
FIG. 5 shows schematically how image information, described in a high-level page-description language, may be processed for an embodiment using two multicolored beams.

FIG. 5 shows how the image information may be processed in the proofing mode of a preferred embodiment of the invention. The image is typically described by a page-description language, such as Postscript (Postscript is a registered trademark of Adobe, Inc. of Mountain View, Calif.). A page-description-language file containing image information for a page, typically in the form of four color separates, for cyan, magenta, yellow and black, is color-corrected, preferably in the manner set forth below, and then sent to a raster image processor (RIP), which generates tone value information for each pixel on the page. Several RIPs may be run in parallel in order to more quickly process the image information. The RIP (or RIPs) provides a cyan tone value, a magenta tone value, a yellow tone value and a black tone value (C, M, Y and K) for each pixel on the page.

The halftone image that will eventually be produced on the proofing media is made up of cyan, magenta, yellow and black dots. Each halftone dot is formed of a plurality of exposed pixels. Using methods known in the art, such as the method set forth in U.S. Pat. No. 4,985,779, these dots are arranged according to rotated screens. The system disclosed in U.S. Pat. No. 4,985,779 has the capability of screening image information according to a screen rotated an angle having an irrational tangent. Other systems, such as that described in patent application Ser. No. 07/809,032, entitled "Rapid Variable Angle Digital Screening," for an invention by Kidd and Lefebvre, can only screen image information according to screens rotated angles having rational tangents. Such rational-tangent systems may also be used with the present invention. Both types of screening systems typically use LUTs.

A preferred embodiment of the invention can plot (or scan) at two different resolutions: a lower resolution, 2000 dpi (dots per inch, or more precisely pixels or microdots per inch), and a higher resolution, 4000 dpi. The system can plot at either resolution in either the one-color/separates mode or in the three-color proofing mode. The rational-tangent system is better able to avoid auto-moiré effects in the reproduced image, and the preferred embodiment uses a rational-tangent system at the 2000 dpi resolution. At higher resolutions the auto-moiré effects are not as apparent, so an irrational-tangent system is used for the 4000 dpi resolution, because irrational-tangent systems are better at eliminating cross-moiré effects.

In the FIG. 5 process, the continuous-tone-value information generated pixel-by-pixel by the RIP is composed into vertical lines in the order they are to be plotted (see the discussion above regarding FIGS. 4A–4C). A screening board then creates screened CMYK information from these CMYK continuous-tone values. A binary system may be used, where there is a bit for each of the four colors, cyan, magenta, yellow and black, at each pixel on the substrate. This bit provides the information whether a dot for that color covers that pixel. A value of one for this bit may indicate that that color is present at that pixel, and a value of zero that that color is not present. (Referring to FIG. 4A, the pixels can be identified by vertical—circumferential—line (L) and pixel (P).)

This screened CMYK bit information is then provided to the machine control system, or more specifically, the Imaging Interface Module (IIM), which sets the cyan, magenta and yellow bits ($C_{L,P}$, $M_{L,P}$, $Y_{L,P}$) all to one if the black bit for that pixel ($K_{L,P}$) is equal to one. This CMY bit information ($C_{L,P}$, $M_{L,P}$, $Y_{L,P}$) is then sent to the radio-frequency (RF) generator, which provides to the AOMs the signals having the appropriate frequencies, so that if $C_{L,P}$ is equal to one, for example, the AOM for the red laser creates a deflected red sub-beam that exposes the substrate at pixel P on line L. Likewise, the appropriate signals are sent to the AOMs for the green and blue lasers depending on the values of the $M_{L,P}$ and $Y_{L,P}$ bits respectively.

In the two-combination-beam embodiment, which exposes the substrate in the manner depicted in FIG. 4A, two combination beams 18c are concurrently exposing two lines (L and L+3) on the substrate during each pass (except the first and last image pass). Thus, FIG. 5 shows that the image information for the two lines is processed concurrently, producing CMY bit information for line L ($C_{L,P}$, $M_{L,P}$, $Y_{L,P}$) at the same time as for line L+3 ($C_{L+3,P}$, $M_{L+3,P}$, $Y_{L+3,P}$). In the three- and four-combination-beam embodiments, information for three or four lines respectively are processed concurrently. In general, it is preferred that the information for all the lines being plotted concurrently be processed in parallel.

The processing of the image information may be adapted so as to permit the generation of soft dots (see U.S. Pat. No. 4,985,779) or continuous-tone reproductions by providing the capability of sending a range of CMY values to the RF generator, instead of the binary system discussed above, which uses just zero and one. The minimum and maximum values in the range may represent no exposure or the maximum exposure of the substrate by the particular laser. Intermediate values in the range indicate that the substrate is to be less than fully exposed. For example, a value in the middle of the range may indicate that the substrate should be exposed only one-half of the maximum amount. In order to vary the strength of the beams striking the substrate, the RF generator varies the amplitude of the signals sent to the AOMs' transducers 14. A screening board is not used to make a continuous-tone reproduction, but is used in making a half-tone reproduction using soft dots.

Figure 6:
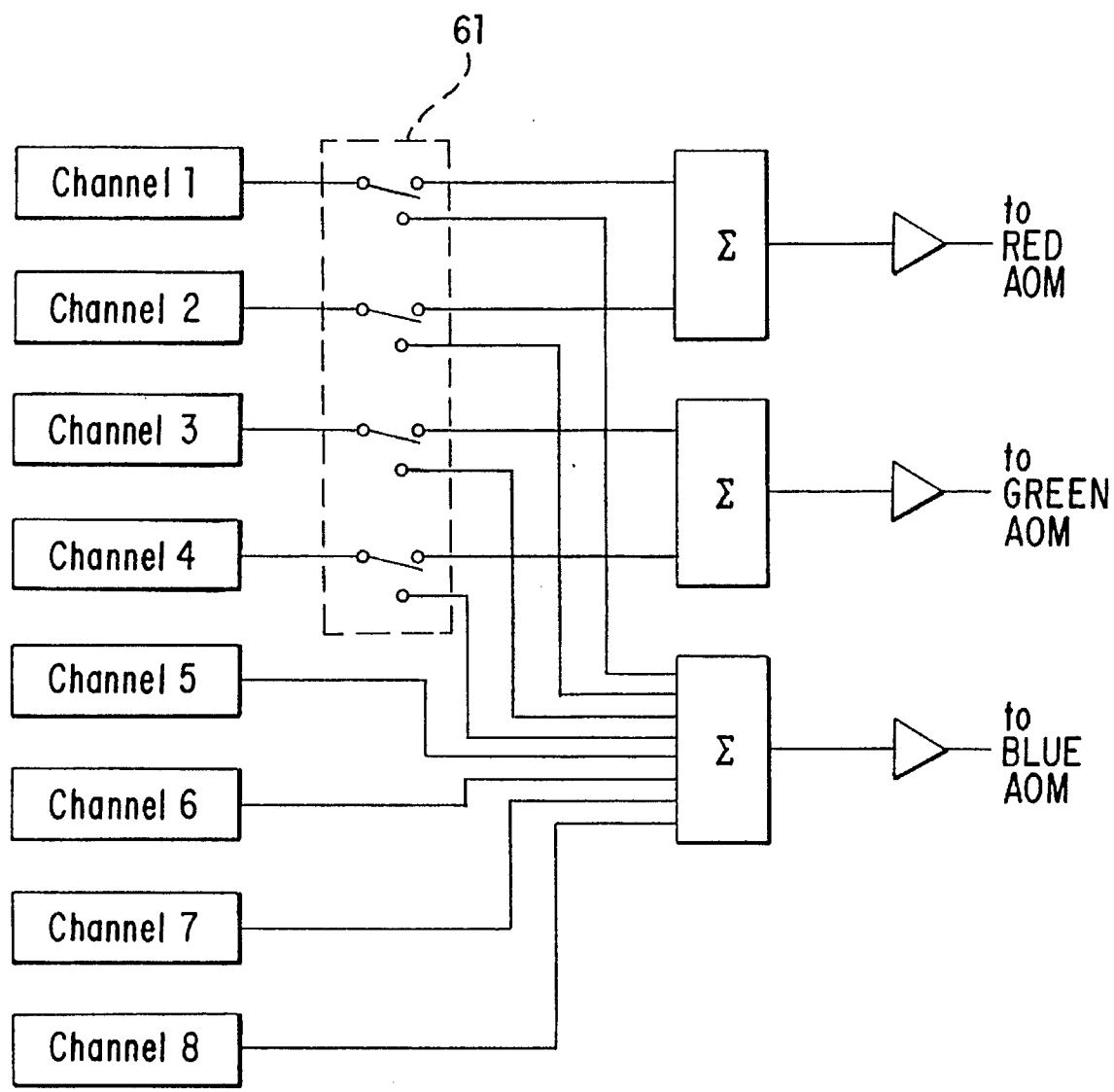
FIG. 6 shows how the channels of a radio-frequency signal generator are connected to acousto-optical modules in an embodiment using two multicolored beams.

FIG. 6 shows how the output channels of the RF generator may be connected to the AOMs. In the one-color mode, all eight channels of the RF generator are used. Each channel produces a signal for controlling each of the eight possible sub-beams. The four-pole-double-throw-type switch 61, which is preferably solid-state, connects channels 1–4 to the summer connected to the AOM for the blue laser. Channels 5–8 are wired directly to the summer connected to the AOM for the blue laser. Thus, in the one-color mode, the signals from all eight channels of the RF generator are sent to the blue laser's AOM, so that the blue beam may expose blue-sensitive film with a swath eight pixels wide. Although the depicted embodiment can create up to eight sub-beams, the system may be modified so that any number of sub-beams may be created in the one-color mode so as to create swaths of any width.

In the three-color proofing mode, channels 7 and 8 are not used. Switch 61 is toggled so that channels 1 and 2 are connected to the red laser's AOM, and channels 3 and 4 are connected to green laser's AOM. Channels 5 and 6 remain connected to the blue laser's AOM. Thus, in the proofing mode, the AOM for each of the original beams 18r, 18g, 18b is connected to two channels of the RF generator, and each of channels provides the signal for each of the two possible sub-beams from each of the laser beams. If it is desired to produce three sub-beams from each of the three original beams in a three-aperture system, so that the substrate may be exposed in the manner set forth in FIG. 4B, nine output channels from the RF generator are necessary. In order to produce n sub-beams from each of the three original beams, 3·n output channels are necessary.

One may use the embodiment described above, which in the one-color/separates mode creates eight sub-beams out of the original blue beam 18b, to expose red-sensitive film instead of blue-sensitive film. However, since the red beam's AOM is connected to only two channels of the RF generator, only two sub-beams may be created out of the original red beam 18r. Thus, plotting on red-sensitive film would take much longer than plotting on blue-sensitive film of the same size. The same would be true if one wanted to use this embodiment for plotting on green-sensitive film. If it is desired to use red- or green-sensitive film normally instead of blue-sensitive film in the one-color mode, the wiring of the channels to the AOMs, as shown in FIG. 6, may be reconfigured so that all eight channels are connected to the AOM for whichever one of the red or green lasers one wishes to use normally in the non-proofing mode. Alternatively, a larger, more complicated switch 61 may be used so as to permit each of the three summers to be connected to each of the eight channels, so as to permit the creation of eight sub-beams from any of the three laser beams 18r, 18g or 18b.

As noted above, the one-color mode of the device may be used to create separates used to create the printing plates that apply to paper differently colored inks (typically cyan, magenta, yellow and black) to form the final printed multicolor image. The multicolor mode may be used to create color proofs representative of the final printed image. Preferably, the same screening system is used in both modes, so that the proof image is screened in the same way that the final printed image is screened.

Although the same screening system is used in both the multicolor and the one-color modes, different dot gains are preferably used in the two modes. Prior-art systems for plotting separates adjust the dot gain to account for the fact that the size of the halftone dots in the final printed image are usually different from—typically larger than—the size of the halftone dots formed on the separates. The primary reason for this increase in halftone-dot size is that the inks tend to spread when applied by the printing plate to the paper. The values stored in the LUTs that are used in screening in prior-art devices have accounted for this increase in halftone-dot size by causing smaller dots to be plotted on the separates. In prior-art systems, different screening LUTs are used for different types of inks and different types of printing processes, because the amount of increase in dot size varies with the ink and the printing process. Also, each of the colors to be printed (e.g., cyan, magenta, yellow and black) typically has an independent screening LUT for adjusting dot gain.

Since, in the multicolor/proofing mode, the halftone dots in the proof are not formed by applying ink from a printing plate onto paper, the halftone dots of the proof would be smaller than the halftone dots of the final printed image if the same screening LUTs are used in both modes. In order to account for the different dot gains in the multicolor and one-color modes, the preferred embodiment of the invention uses different screening LUTs in the multicolor/proof mode from what is used in the one-color/separates mode. Since the purpose of generating a proof is to generate a preliminary image that resembles the final image without performing all the steps normally necessary for creating the final image, information about those steps being eliminated in the proofing process is preferably used in generating the proofs. Information regarding these missing steps is used in creating the proof-mode screening LUTs.

Accordingly, the screening LUTs used in the one-color mode represent the overall system transfer function in generating the final image, i.e., generating the separates, making the printing plates and printing the final image. The overall system transfer function takes into account factors such as the film on which the separates are plotted, the type of printing plates, the process of forming the plates from the separates, the type of printing process, the type of paper or other media being plotted on, and the inks being used. The screening LUTs used in the multicolor/proofing mode should also reflect the transfer function in generating the proof. The proofing transfer function takes into account primarily the characteristics of the media being plotted on. With the screening LUTs used in the proofing mode properly reflecting the overall system transfer function and the proofing transfer function, the halftone dots of the proof plotted during the multicolor mode should be the same size as the halftone dots of the final printed image.

As noted above, in the multicolor mode the original image information is color corrected before that information is sent to the RIP (or RIPs). Because colors of the dyes used in the emulsion on the proof substrate may differ from the colors of the inks used in printing the final image, the color correction is performed in the multicolor proofing mode in order to correct the coloring of the proof by adjusting the weighting of the colors of the proof image, so that the coloring of the proof matches as well as possible the coloring of the final printed image. (Because of the differing colors of the proof's dyes and the inks used in the final printed image define different color spaces, there may be some areas of color in the printed image's color space that are outside of the proof's color space, and thus it is sometimes impossible to accurately depict in the proof image the coloring—or some of the coloring—of the final image. This problem diminishes the more closely the colors of the proof's dyes match the colors of inks of the final printed image.) Color-correction factors are preferably represented in color-correction LUTs. Different color-correction LUTs may be used to correct the colors for different proofing emulsions, the dye colors of which can vary, and to account for whether the proofing emulsions are positive-acting or negative-acting.

It is sometimes necessary to correct the colors of the final printed image to account for the different types of inks and printing processes that may be used and to reflect subjective viewer evaluations. This color correction for the final printed image may be done in software before the image information is sent to the plotter. The color-correction LUTs, as described above, are meant to provide color correction of the proof, so that the coloring of the proof image corresponds as closely as possible to the coloring of the final printed image.

By providing, in the one-color mode, color correction and separate screening LUTs that incorporate the overall system transfer function and the proofing transfer function for dot gain, in addition to using the same screening system in both modes, the system is able to create a proof that accurately depicts what the final printed image will look like.

The A/O crystals 10 diffract light of different wavelengths by different amounts, the blue light being bent less than red exiting the solid. In the preferred embodiment of the system represented in FIG. 2, the frequencies of the vibratory stimuli are set for a beam having a certain color, and the deflection of the sub-beams 18s having different colors are compensated for optically with color-compensating lenses, such as those shown in FIG. 2. For a sub-beam that is deflected too much exiting the A/O crystal (because it has a longer wavelength than the beam that the frequencies of the vibratory stimuli are set to), a color-compensating lens reduces the amount of deflection. For a sub-beam that is deflected too little (because it has a shorter wavelength), another color-compensating lens increases the amount of deflection. Thus, in the FIG. 2 embodiment, the vibratory frequencies are determined for the green beam 18g, so that the green sub-beams 18s do not need a color-compensating lens, the blue sub-beams 18s have their deflections increased with a concave color-compensating lens, and the red sub-beams 18s have their deflections decreased by a convex lens. Using color-compensating lenses permits the use of the same RF-signal frequency for plotting each color at a given pixel.

Alternatively, the phenomenon of differently colored beams being deflected different amounts by the AOMs with vibratory stimuli of the same frequency may be compensated for electronically. This is done by adjusting the frequency of the vibratory stimulus provided to the A/O crystal 10 by the piezo-crystal transducer 14, based on the color of the beam being deflected by the A/O crystal. Although this solution avoids the need for color-compensating lenses, it requires that, for a given pixel, a different RF-signal frequency be generated for each color.

The alignment of the lasers and the scanning head 30 is very important for properly registering on the substrate 26 the cyan, magenta and yellow components of the image. Each of the three beams, red, green and blue, making up each of the combination beams 18c must be aligned so that all three strike at the same point on the substrate 26. In the system represented in FIG. 2, the lasers' beams pass through adjustable refractor plates and aligned apertures 48 in the beam shaping optics before striking the AOMs. This permits the lasers to be replaced without having to do a complete optical realignment.

The system may be designed to plot at any resolution. In the preferred embodiment of the system, the resolution may be set for either 2000 or 4000 dpi. The resolution is set to one of these two resolutions by using one of two focusing lenses 53 or 55, which have different focal lengths. A movable mirror 51, in one position, directs the combination beams 18c through one focusing lens 53 and through a cube-shaped beam splitter 68 onto the substrate 26 mounted on the drum 40. When the movable mirror 51 is moved out of the way, the combination beams 18c follow a second optical path, in which the combination beams are reflected off of a pair of mirrors 50 and pass through the other focusing lens 55. In the second optical path, the combination beams are reflected by the beam splitter 68 towards the substrate 26. In an alternative embodiment, continuously variable magnification may be used to provide a range of possible resolutions.

In the preferred embodiment, the scanning head 30 is continuously moving along the length of the drum while the drum turns, thereby creating a helical swath around the drum. This manner of scanning is referred to as the slew mode, as opposed to an alternative mode wherein the scanning head 30 does not move while a swath or line on the substrate 26 is being exposed and then moves to the next position during the backporch portion 27 of the drum rotation, i.e., when that portion of the drum 40 not covered by the substrate 26 is adjacent the scanning head 30. Since the preferred embodiment operates in the slew mode, different resolutions skew the axis by an amount related to the swath width. Orthogonality can be achieved by use of a vertical refractor, by active mechanical adjustment, or by offsetting the pixel time base as the plot is generated. The first of these three solutions is used in the preferred embodiment: a refractor plate 74, mounted in the optical carriage, rotates to compensate for the different swaths. The drum's speed is also adjusted for the resolution—the finer the resolution, the slower the drum is turned. The drum 40 is turned by a motor 89 which is controlled by the processor. A shaft encoder 87 measures the speed of the drum 40 and provides this information to the processor. In addition, the speed of the optics carriage must be adjusted. As noted above, the processor controls the speed of the motor 99 turning the lead screw 95 that moves the optics carriage, while an encoder 97 provides lead-screw-speed or optics-carriage-position information to the processor. The processor also controls the aperture plate 25 in the aperture system, the refractor plate 74 and the movable mirror 51, in addition to processing the image information to be sent to the RF generator.

Whichever focusing lens 53 or 55 is used, the beam splitter 68 allows or directs a portion of the combination beams 18c towards the feedback photodetector. The feedback photodetector is used to adjust the sub-beam intensity to the desired value. A sub-beam's intensity may be adjusted by adjusting the neutral density wheel, the laser current and/or the amplitude of the vibratory stimulus associated with that beam. This adjustment is typically done in the backporch 27 portion of the drum rotation. The processor receives readings from the feedback photodetector, and based on these readings adjusts the neutral-density wheel, the laser current and/or the vibratory stimulus amplitude accordingly.

Figure 7:
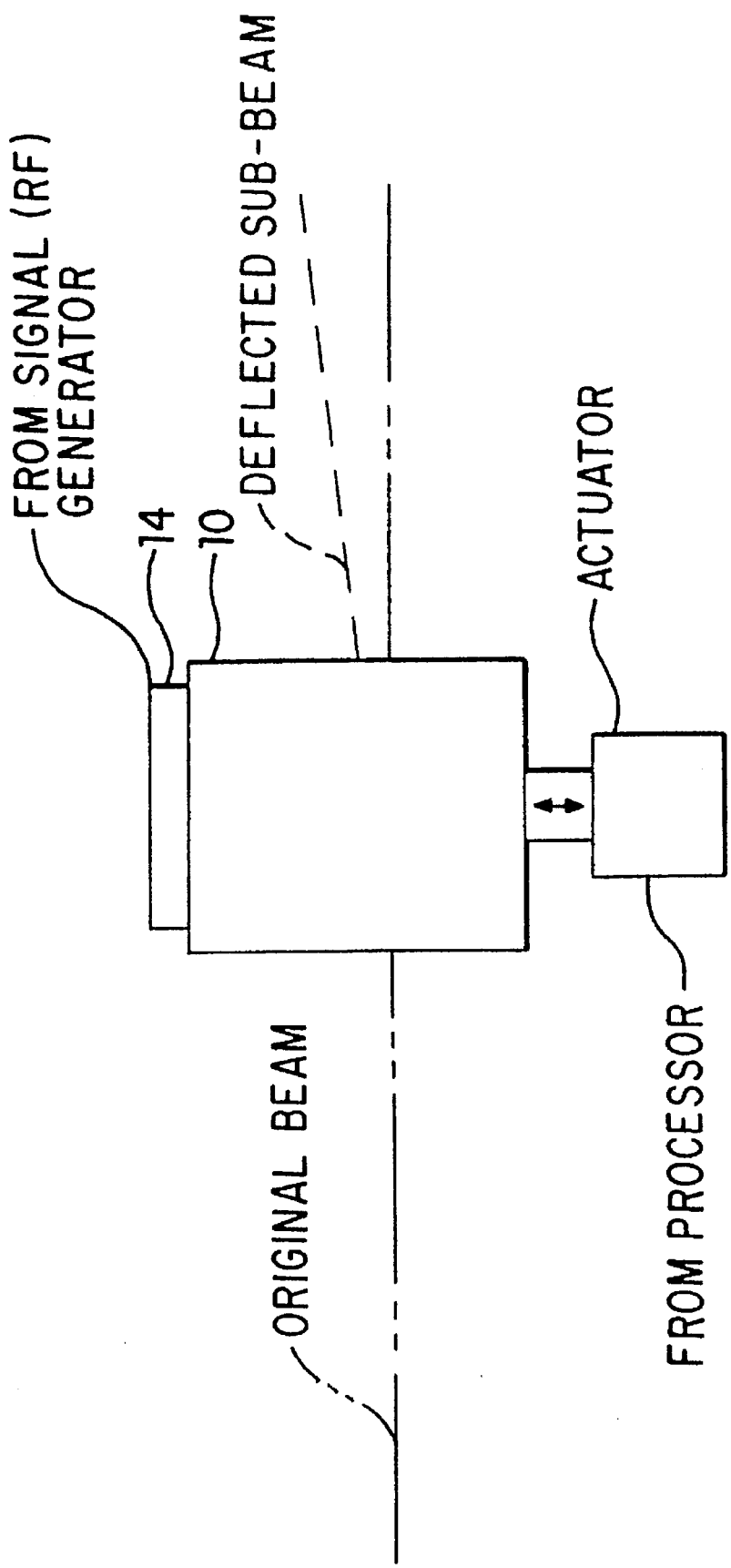
FIG. 7 shows how the position of an acousto-optical module may be adjusted with respect to the incoming beam in order to adjust the "pedestal" delay.

The feedback photodetector is also used to determine the "pedestal" delay between the generation of the RF signal to the arrival of the deflected sub-beam to the optical carriage. Variations in pedestal delay result primarily from the different lengths the vibratory stimuli must travel through the A/O crystals from the transducers 14 to the point in the crystal where the original beams 18r, 18g and 18b enter the A/O crystals. The further the vibrations must travel the greater the delay between the generation of the RF signal and the creation of the sub-beam. The pedestal delay may be adjusted electronically by altering the timing of the RF signal. In the preferred embodiment, the pedestal delay is adjusted mechanically by moving the AOM with respect to the original beam exiting the aperture 48 in a direction transverse to the original beam. FIG. 7 shows the components of such a delay control system. It has been found that it may not be necessary to adjust the distance between the transducer 14 and the point where the original beam enters the A/O crystal 10 more than once, when the system is installed. To make the original adjustment, the feedback photodetector provides information representing the delay between the creation of the signal by the signal generator and the detection of the sub-beam associated with that signal by the photodetector. This information may be represented on an oscilloscope, for example, so that the installer can make minor adjustments to the position of the AOMs. It has been found that the system is more sensitive to changes in the pedestal delay in the scanning mode (see below) than in the plotting mode, and thus continual adjustments are more likely to be necessary to the position of the AOM, although continual adjustments may be necessary in the plotting mode as well. In order to make continual adjustments for either the scanning or plotting modes, the timing of the signal created by the RF generator may be altered, or the actuator shown in FIG. 7 may be controlled by the processor, which receives information from the feedback photodetector and determines the delay between the creation of the signal by the signal generator and the detection of the sub-beam associated with that signal by the photodetector. The processor causes each of the AOMs to be moved in a direction transverse to its incoming original beam, so that the delay is the same for each of the differently colored sub-beams. This adjustment preferably takes place in the backporch portion of the drum rotation.

Properly adjusting the pedestal delay ensures that each of the three sub-beams 18s, red, green and blue, making up each of the combination beams 18c strikes the substrate 26 at the same time. It is important to ensure that the three sub-beams making up each combination beam are temporally coincident as well as spatially coincident so that there is no undesired offset between the cyan, magenta and yellow dots in the final image. Temporal coincidence is achieved by adjusting the pedestal delay. Spatial coincidence is achieved by aligning the differently colored beams so that as they exit the scanning head 30, all the sub-beams 18s associated with a given combination beam 18c strike the same pixel on the substrate 26.

For scanning an image, a light collection and detection system may be used. To this end, light-collecting fiber-optic bundles may be mounted on the scanning head 30 on the optical carriage in the same manner as described in U.S. Pat. No. 4,992,890 (see in particular column 7, lines 38–53, therein) so as to permit scanning in the reflective mode. All three lasers are preferably used in the scanning, and red-, green- and blue-sensitive photo-detectors read the reflected light and generate RGB tone values for each pixel position on the scanned image.

Although the invention has been described with reference to a preferred embodiment, it will be understood by one of ordinary skill in the art that various modifications can be made without departing from the spirit and the scope of the invention, as set forth in the claims hereinbelow. For example, although in the embodiment depicted in the figures has three lasers, any number of original beams greater than one may be used. Also, as noted above, any number of sub-beams may be created from the original beams.

What is claimed is:

1. A system for plotting a graphic image on a substrate, the system comprising:

source means for providing at least two original beams: a first original beam having a first wavelength and a second original beam having a second wavelength, wherein the first and second wavelengths are different;

deflection means, having an input, for deflecting along a path a portion of each of the two original beams by an amount dependent upon the frequency of a signal that is present at the input;

a signal generator for providing a signal, having a frequency, to the input of the deflection means;

scanning-head means for directing the deflected beam portions onto the substrate;

first axis translation means for causing relative movement of the deflected beam portions along a first axis of the substrate; and second axis translation means for causing relative movement of the deflected beam portions along a second axis of the substrate, wherein the deflection means includes an acousto-optical crystal for each of the two original beams, positioned so that the beam passes through the crystal, and a transducer for causing vibrations in the crystal based on the frequency of the signal received by the deflection means, and wherein the system further includes delay means for altering the distance between the transducer and where the beam first enters the crystal, so as to alter how much time passes between when the signal generator provides a signal and the beam portion associated with that signal reaches the substrate.

2. A system according to claim 1, further including timing means for altering the timing of the signal generated by the signal generator, so that each of the beam portions associated with a given pixel on the substrate strike the substrate at the same time.

3. A system for plotting a graphic image on a substrate, the system comprising:

source means for providing at least two original beams: a first original beam having a first wavelength and a second original beam having a second wavelength, wherein the first and second wavelengths are different;

deflection means, having an input, for deflecting along a path a portion of each of the two original beams by an amount dependent upon the frequency of a signal that is present at the input;

a signal generator for providing a signal, having a frequency, to the input of the deflection means;

scanning-head means for directing the deflected beam portions onto the substrate;

first axis translation means for causing relative movement of the deflected beam portions along a first axis of the substrate; and second axis translation means for causing relative movement of the deflected beam portions along a second axis of the substrate, wherein the signal generator provides a plurality of signals for each of the two original beams, so that the deflection means creates a plurality of beam portions from each of the two original beams, wherein the deflection means includes an acousto-optical crystal for each of the two original beams, positioned so that the beam passes through the crystal, and a transducer for causing vibrations in the crystal based on the frequency of the signal received by the deflection means; and wherein the system further includes means for altering the distance between the transducer and where the beam first enters the crystal, so as to alter how much time passes between when the signal generator provides a signal and the beam portion associated with that signal reaches the substrate.

4. A system for plotting a graphic image on a substrate, the system comprising:

source means for providing at least two original beams: a first original beam having a first wavelength and a second original beam having a second wavelength, wherein the first and second wavelengths are different;

deflection means, having an input, for deflecting along a path a portion of each of the two original beams by an amount dependent upon the frequency of a signal that is present at the input;

a signal generator for providing a signal, having a frequency, to the input of the deflection means;

scanning-head means for directing the deflected beam portions onto the substrate;

first axis translation means for causing relative movement of the deflected beam portions along a first axis of the substrate, wherein the first axis is disposed circumferentially about a cylinder, on which the substrate is situated, the cylinder having a central axis; and second axis translation means for causing relative movement of the deflected beam portions along a second axis of the substrate, wherein the second axis is disposed parallel to the cylinder's central axis;

a cylinder for mounting the substrate, wherein the first axis is disposed circumferentially about the cylinder, the cylinder having a central axis, and the second axis is disposed parallel to the central axis;

wherein the first axis translation means includes means for rotating the cylinder around the central axis, and the second axis translation means includes means for moving the scanning-head means in a direction parallel to the central axis;

wherein the signal generator includes means for providing n signals for each of the two original beams, so that the deflection means creates n beam portions from each of the two original beams, such that each beam portion exposes points on the substrate that define a line substantially parallel to the first axis, each line having a width w, so as to cause the substrate to be plotted along a plurality of helical paths around the circumference of the cylinder, wherein the system further includes control means for controlling the first and second translation means so that between each pair of adjacent lines being plotted simultaneously by beam portions from the same beam there is a strip of the substrate n times w wide, wherein the second translation means causes relative movement of a distance n times w between the scanning head means and the substrate along the second axis from one pass to the next, and wherein the first translation means causes the scanning head to pass over the substrate more than once in a direction parallel to the first axis;

wherein the signal generator includes means for producing, when the first original beam is used to expose a substrate sensitive primarily only to the first wavelength, a plurality of signals which includes a first set of signals below an established frequency and a second set of signals above the established frequency, and the signal generator further includes means for supplying simultaneously to the deflection means a signal from the first set and a signal from the second set in successive pairs of signals so as to cause scanning of beam portions in a direction parallel to the second axis simultaneously at two different and proximate locations on the first axis.

5. A system for plotting a graphic image on a substrate, the system comprising:

source means for providing at least two original beams: a first original beam having a first wavelength and a second original beam having a second wavelength, wherein the first and second wavelengths are different;

deflection means, having an input, for deflecting along a path a portion of each of the two original beams by an amount dependent upon the frequency of a signal that is present at the input;

a signal generator for providing a signal, having a frequency, to the input of the deflection means;

scanning-head means for directing the deflected beam portions onto the substrate;

first axis translation means for causing relative movement of the deflected beam portions along a first axis of the substrate; and second axis translation means for causing relative movement of the deflected beam portions along a second axis of the substrate;

wherein the signal generator includes means for providing n signals for each of the two original beams, so that the deflection means creates n beam portions from each of the two original beams, such that each beam portion exposes points on the substrate that define a line substantially parallel to the first axis, each line having a width w, wherein the system further includes control means for controlling the first and second translation means so that between each pair of adjacent lines being plotted simultaneously by beam portions from the same beam there is a strip of the substrate n times w wide, wherein the second translation means causes relative movement of a distance n times w between the scanning head means and the substrate along the second axis from one pass to the next, wherein the first translation means causes the scanning head to pass over the substrate more than once in a direction parallel to the first axis;

wherein the signal generator includes means for producing, when the first original beam is used to expose a substrate sensitive primarily only to the first wavelength, a plurality of signals which includes a first set of signals below an established frequency and a second set of signals above the established frequency; and wherein the signal generator further includes means for supplying simultaneously to the deflection means a signal from the first set and a signal from the second set in successive pairs of signals so as to cause scanning of beam portions in a direction parallel to the second axis simultaneously at two different and proximate locations on the first axis.

6. A system for plotting a graphic image on a substrate, the system comprising:

source means for providing at least two original beams: a first original beam having a first wavelength and a second original beam having a second wavelength, wherein the first and second wavelengths are different;

deflection means, having an input, for deflecting along a path a portion of each of the two original beams by an amount dependent upon the frequency of a signal that is present at the input;

a signal generator for providing a signal, having a frequency, to the input of the deflection means;

scanning-head means for directing the deflected beam portions onto the substrate;

first axis translation means for causing relative movement of the deflected beam portions along a first axis of the substrate;

second axis translation means for causing relative movement of the deflected beam portions along a second axis of the substrate; and correction means, located in the path of the deflected portion of the second original beam, for effectively causing the deflected portion of the second original beam to be deflected the same amount as the first beam in response to a signal of a given frequency.

7. A system for plotting a graphic image on a substrate, the system comprising:

source means for providing at least two original beams: a first original beam having a first wavelength and a second original beam having a second wavelength, wherein the first and second wavelengths are different;

deflection means, having an input, for deflecting along a path a portion of each of the two original beams by an amount dependent upon the frequency of a signal that is present at the input;

a signal generator for providing a signal, having a frequency, to the input of the deflection means;

scanning-head means for directing the deflected beam portions onto the substrate;

first axis translation means for causing relative movement of the deflected beam portions along a first axis of the substrate;

second axis translation means for causing relative movement of the deflected beam portions along a second axis of the substrate;

wherein the signal generator provides a first signal having a first frequency to the deflection means so as to deflect a portion of the first original beam a desired amount and provides a second signal having a second frequency so as to deflect a portion of the second original beam the same amount as the first beam.

8. A system for receiving continuous-tone values representing an image, plotting separates for making printing plates for printing a halftone reproduction of the image, and plotting a multicolor proof of the printed halftone reproduction, both the printed reproduction and the proof being formed of halftone dots, the system comprising:

source means for providing at least two original beams: a first original beam having a first wavelength and a second original beam having a second wavelength, wherein, in plotting separates, only the first beam is used to expose a substrate sensitive to the first wavelength, and in plotting the multicolor proof, both the first and second original beams are used to expose a substrate sensitive to both the first and second wavelengths;

screening means for converting the continuous-tone values into halftone information, wherein, for a given halftone image at a given resolution, the multicolor reproduction and the one-color reproduction are screened in the same manner;

dot-gain means for adjusting the size of the proof's halftone dots, so that the size of each of the proof's halftone dots is approximately the same size as the corresponding halftone dot of the corresponding printed reproduction created from the printing plates made from the separates plotted from the same image information; and modulation means for controlling the intensity of the beams based on the halftone-image information.

9. A system according to claim 8, wherein the screening means includes look-up tables and the dot-gain means includes separate look-up tables for converting the continuous-tone information into halftone information when plotting the proof and when plotting the separates.

10. An image information converter comprising:

means for mounting a substrate;

source means for providing an original beam;

deflection means, having an input, for deflecting along a path a portion of the original beam by an amount dependent upon the frequency of a signal that is present at the input, such that the deflected beam portion is directed towards the substrate, wherein the deflection means includes an acousto-optical crystal, positioned so that the beam passes through the crystal, and a transducer for causing vibrations in the crystal based on the frequency of the signal received by the deflection means;

a signal generator for providing a signal, having a frequency, to the input of the deflection means; and delay means for altering the distance between the transducer and where the beam first enters the crystal, so as to alter how much time passes between when the signal generator provides a signal and the beam portion associated with that signal reaches the substrate.

11. An image information converter according to claim 10, further comprising:

delay detection means for measuring a value related to how much time elapses between when the signal generator creates a signal and when the beam portion related to that signal strikes the substrate; and delay control means, connected to the delay detection means and the delay means, for causing the delay means to alter the distance between the transducer and where the beam first enters the crystal, so as to cause the beam portion to strike the substrate at a desired position.

12. A system according to claim 6, wherein the correction means includes a lens located in the path of the deflected portion of the second original beam.

* * * * *